UNITED STATES PATENT OFFICE 2,460,747

5-ALKOXY-ALKYL, 5-CYCLOHEXYL HYDANTOINS

Henry R. Henze, Austin, Tex., assignor to Parke, Davis & Company, Detroit, Mich., a corporation of Michigan No Drawing. Application July 10, 1944, Serial No. 544,331

4 Claims. (Cl. 260—309.5)

The invention relates to a new class of chemical compounds which are valuable for therapeutic use, especially as anticonvulsants having relatively high anticonvulsant activity combined with low toxicity.

The compounds of the invention have the general formula

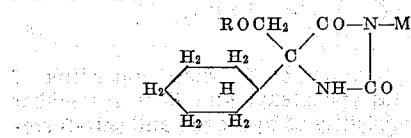

where R represents an alkyl radical of the straight or branched chain series having 1 to 6 carbon atoms including cyclohexyl. M of this formula represents a member of the class hydrogen and basic elements or groups forming nontoxic salts of the hydantoins, such as sodium, calcium, magnesium, ammonium and substituted ammonium, for example, mono- and di-alkyl ammonium and corresponding hydroxy alkyl ammonium.

In preparing the compounds of this invention, I prefer to first prepare the corresponding 5-alkoxymethyl-5-phenyl hydantoins as set forth in my copending applications, Serial Nos. 535,743 and 535,744, both filed May 15, 1944. These phenyl hydantoins are prepared by reacting the corresponding ketone intermediate of the formula,

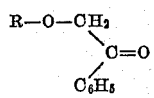

where R has the same significance as in the formula given above for the final products, with an alkaline water-soluble cyanide and aqueous ammonium carbonate or the like combination consisting of, or capable of generating, NH$_3$, carbon dioxide, and water, acidifying the reaction mixture, and separating the hydantoin. The intermediate ketones are, in most cases, prepared by the action of phenyl magnesium halide on the appropriate alkoxymethyl cyanide.

The 5-alkoxymethyl-5-cyclohexyl hydantoins of the present invention are prepared by hydrogenation of the corresponding phenyl hydantoins in alcohol in the presence of Adams' platinum catalyst until complete hydrogenation is effected. This may require from 4 to 20 hours but is usually completed in 6–7 hours. The bottle of the hydrogenator is then opened and the catalyst filtered from the solution. In case the resulting cyclohexyl hydantoin is sufficiently less soluble to cause it to separate from the solution prior to the above filtration step, the mixture is warmed before filtration. After filtering, the cyclohexyl hydantoins may be separated from the alcoholic filtrate by dilution with water and recrystallizing from diluted ethyl alcohol.

The new 5-alkoxymethyl-5-cyclohexyl hydantoins of the present invention have the properties shown in the following table where the symbol R is the same as in the general formula given above:

| —R | 5-Alkoxymethyl-5-Cyclohexyl Hydantoins | | | | |
|---|---|---|---|---|---|
| | M. P., °C. (cor.) | Carbon, percent | | Hydrogen, percent | |
| | | Calcd. | Found | Calcd. | Found |
| —CH$_3$ | 236.5 | 58.39 | 58.27 | 8.02 | 7.91 |
| —CH$_2$CH$_3$ | 191.5–192.0 | 59.98 | 59.89 | 8.38 | 8.41 |
| —CH$_2$CH$_2$CH$_3$ | 183.0–183.5 | 61.39 | 61.20 | 8.72 | 8.72 |
| —CH(CH$_3$)$_2$ | 220 | 61.39 | 61.30 | 8.72 | 8.84 |
| —CH$_2$CH$_2$CH$_2$CH$_3$ | 177 | 62.66 | 62.45 | 8.98 | 9.10 |
| —CH$_2$CH(CH$_3$)$_2$ | 213 | 62.66 | 62.56 | 8.98 | 9.04 |
| —CH(CH$_3$)CH$_2$CH$_3$ | 240 | 62.66 | 62.51 | 8.98 | 9.05 |
| —CH$_2$CH$_2$CH$_2$CH$_2$CH$_3$ | 152.0–152.5 | 63.80 | 63.85 | 9.28 | 9.21 |
| —CH$_2$CH$_2$CH(CH$_3$)$_2$ | 191 | 63.80 | 64.00 | 9.28 | 9.34 |
| —CH(CH$_3$)CH$_2$CH$_2$CH$_3$ | 208.0–208.5 | 63.80 | 63.72 | 9.28 | 9.25 |
| —CH(CH$_2$CH$_3$)$_2$ | 245.0–245.5 | 63.80 | 63.70 | 9.28 | 9.33 |
| —CH(CH$_3$)CH(CH$_3$)$_2$ | 261.0–262.0 | 63.80 | 63.52 | 9.28 | 9.37 |
| —CH$_2$(CH$_2$)$_4$CH$_3$ | 177 | 64.83 | 64.80 | 9.52 | 9.60 |
| —C$_6$H$_{13}$ (cyclo) | 254.0–254.5 | 65.27 | 65.25 | 8.90 | 9.00 |

The preparation of the compounds of this invention is more fully illustrated in the following example relating to 5-ethoxymethyl-5-cyclohexyl hydantoin.

*Example.—Preparation of 5-ethoxymethyl-5-cyclohexyl hydantoin*

Ethoxymethyl phenyl ketone having a boiling point of about 122° C. at 15 mm. pressure is obtained from ethoxyacetonitrile and phenyl magnesium bromide.

One mole of ethoxymethyl phenyl ketone is placed in 800 cc. of ethyl alcohol and to this is added a cyanide solution containing slightly over two moles of potassium cyanide in water. About three moles of ammonium carbonate are added and the reactant warmed at 55-60° C. for about 16 hours. The reaction mixture is then cooled and acidified with dilute sulfuric acid under a hood. Hydrogen cyanide is evolved. The resulting precipitate is cooled and washed with water. The product can be purified by dissolving it in water containing sodium hydroxide, the solution treated with decolorizing charcoal, filtered, and the filtrate treated with carbon dioxide to precipitate pure white 5-ethoxymethyl-5-phenyl hydantoin having a melting point of 191.6° C.

0.25-0.30 g. of Adams' platinum catalyst is placed in the bottle of a hydrogenator and covered with 80 cc. of 95% alcohol. The bottle is closed and hydrogen introduced up to pressure of 900 mm. The shaker is then started and the platinum oxide is reduced to the metal. The shaker is then stopped, the container opened and a solution of 10 g. of 5-ethoxymethyl-5-phenyl hydration in 100 cc. of 95% alcohol and 12 cc. of concentrated hydrochloric acid is introduced. The hydrogen pressure is again raised to 900 mm. and the shaker started and continued as long as a drop in hydrogen pressure shows that reduction is occurring. Complete hydrogenation is usually attained in 6 or 7 hours. The bottle is then opened and the catalyst filtered from the solution and the filtrate diluted with water to precipitate 5-ethoxymethyl-5-cyclohexyl hydantoin. After recrystallization from diluted ethyl alcohol it has a melting point of 191.5-192.0° C. When mixed with 5-ethoxymethyl-5-phenyl hydantoin it has a melting point of 160-165° C. The yield obtained in the hydrogenation is 90-95%.

The other cyclohexyl hydantoins shown in the above table are prepared in the same manner starting with the corresponding alkoxymethyl phenyl ketone.

The sodium salts of each of the hydantoins listed in the above table are prepared by reacting the hydantoin with sodium hydroxide. Other salts are prepared by using, instead of sodium hydroxide, a solution of another alkali metal hydroxide, an alkaline earth metal hydroxide, ammonium hydroxide or an amine to obtain the corresponding salts indicated in the general formula under the symbol M.

The therapeutic agents of my invention, either in the form of the hydantoins or their salts, may be administered perorally or parenterally as by injection. They can be suspended or dissolved in inert carrier liquids such as in aqueous solution or in suspension in animal or vegetable oils or fats before administration. In general, the dosage perorally of the hydantoins and their sodium salts is in the neighborhood of one or two grams per day for an adult person, given in divided doses of about one-third to about one-half gram per dose. However, the exact dosage will vary with the individual and with the particular hydantoin used.

What I claim as my invention is:

1. A compound having the formula

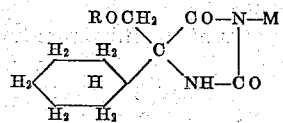

where R is a member of the class consisting of lower alkyl and cyclohexyl and M is a member of the class consisting of hydrogen and salt-forming groups non-toxic to the human body.

2. 5-Methoxymethyl-5-cyclohexyl hydantoin.
3. 5-Ethoxymethyl-5-cyclohexyl hydantoin.
4. 5-Propoxymethyl-5-cyclohexyl hydantoin.

HENRY R. HENZE.

REFERENCES CITED

The following references are of record in the file of this patent:

UNITED STATES PATENTS

| Number | Name | Date |
| --- | --- | --- |
| 2,155,863 | Jacobson | Apr. 25, 1939 |
| 2,327,890 | Henze | Aug. 24, 1943 |

OTHER REFERENCES

Henze et al., "J. Am. Chem. Soc." (March 1943), vol. 65, page 324.